(12) United States Patent
Lee et al.

(10) Patent No.: US 9,883,667 B2
(45) Date of Patent: Feb. 6, 2018

(54) BUG ZAPPER

(71) Applicant: National Kaohsiung University of Applied Sciences, Kaohsiung (TW)

(72) Inventors: Hsiao-Yi Lee, Kaohsiung (TW); Yu-Nan Liu, Kaohsiung (TW); Yu-Jen Liu, Kaohsiung (TW); Hsin-Yi Ma, Kaohsiung (TW)

(73) Assignee: National Kaohsiung University of Applied Sciences, Kaohsiung (TW)

( * ) Notice: Subject to any disclaimer, the term of this patent is extended or adjusted under 35 U.S.C. 154(b) by 136 days.

(21) Appl. No.: 14/953,282

(22) Filed: Nov. 27, 2015

(65) Prior Publication Data

US 2016/0174539 A1    Jun. 23, 2016

(30) Foreign Application Priority Data

Dec. 19, 2014    (TW) .............................. 103144511 A

(51) Int. Cl.
*A01M 1/08*    (2006.01)
*A01M 1/22*    (2006.01)

(52) U.S. Cl.
CPC .............. *A01M 1/223* (2013.01); *A01M 1/08* (2013.01)

(58) Field of Classification Search
CPC ............ A01M 1/04; A01M 1/06; A01M 1/08; A01M 1/106; A01M 1/22; A01M 1/223
USPC ................. 43/107, 112, 113, 122, 124, 132.1
See application file for complete search history.

(56) References Cited

U.S. PATENT DOCUMENTS

| 3,041,773 | A | * | 7/1962 | Gagliano | ................ | A01M 1/08 43/113 |
| 3,196,577 | A | * | 7/1965 | Plunkett | ................. | A01M 1/08 43/113 |
| 4,141,173 | A | * | 2/1979 | Weimert | ................ | A01M 1/08 43/113 |
| 4,908,978 | A | * | 3/1990 | Zacharias | ............... | A01M 1/06 43/111 |

(Continued)

FOREIGN PATENT DOCUMENTS

| TW | M337975 U | 8/2008 |
| TW | M447677 U | 3/2013 |

OTHER PUBLICATIONS

Hsiao-Yi Lee, Nai-Ren Zheng, Qing-Yuan Huang, Gui-Fu Deng and Bo-Wei Liu, "With intelligent power management of solar LED mosquito lamps", Symposium—Southern District teachers and commercialization of creative competition, Apr. 30, 2014, 20 pages, Southern Taiwan Teaching Learning Resource Center, Taiwan.

*Primary Examiner* — David J Parsley
(74) *Attorney, Agent, or Firm* — Alan D. Kamrath; Kamrath IP Lawfirm, P.A.

(57) ABSTRACT

A bug zapper includes a body, a fan and a light source. The body has a compartment, an opening, a channel arranged between the compartment and the opening, and a coupling portion arranged between the compartment and the channel. The channel is formed by an enclosed reflection wall and gradually expands from the coupling portion towards the opening. The fan is coupled with the coupling portion. The light source is mounted on a location of the body adjacent to the fan and irradiates light in the channel. As such, the efficiency in attracting the mosquitoes is outstanding, and the negative effect to the human is reduced.

18 Claims, 7 Drawing Sheets

(56) References Cited

U.S. PATENT DOCUMENTS

| | | | | |
|---|---|---|---|---|
| 5,255,468 | A * | 10/1993 | Cheshire, Jr. | A01M 1/023 43/112 |
| 5,647,164 | A * | 7/1997 | Yates | A01M 1/023 43/113 |
| 5,669,176 | A * | 9/1997 | Miller | A01M 1/023 43/107 |
| 6,560,919 | B2 * | 5/2003 | Burrows | A01M 1/145 43/107 |
| 6,854,208 | B1 * | 2/2005 | Chuang | A01M 1/2027 261/84 |
| 7,073,287 | B2 * | 7/2006 | Lau | A01M 1/02 43/107 |
| 7,784,215 | B2 * | 8/2010 | Cohnstaedt | A01M 1/04 362/231 |
| 8,281,514 | B2 * | 10/2012 | Fleming | A01M 1/04 239/34 |
| 2002/0020105 | A1 * | 2/2002 | Sharpe | A01M 1/08 43/111 |
| 2004/0181997 | A1 * | 9/2004 | Lee | A01M 1/08 43/139 |
| 2009/0277074 | A1 * | 11/2009 | Noronha | A01M 1/08 43/113 |

* cited by examiner

BUG ZAPPER

CROSS REFERENCE TO RELATED APPLICATION

The application claims the benefit of Taiwan application serial No. 103144511, filed on Dec. 19, 2014, and the subject matter of which is incorporated herein by reference.

BACKGROUND OF THE INVENTION

1. Field of the Invention

The present invention generally relates to an insecticidal device and, more particularly, to a bug zapper.

2. Description of the Related Art

Mosquitoes are the infectious vector of many diseases and breed quickly in summer where the temperature and humidity are high. As such, the mosquito-borne diseases appear to be more rampant in such an environment. The statistic of World Health Organization (WHO) shows that approximately 1 million people have died from mosquito-borne diseases every year. Thus, it has been an issue of concern on the reduction of the number of the mosquitoes and the precaution against the mosquito bite.

FIG. 1 shows a conventional bug zapper 9, which includes a transparent box 91, an ultraviolet light tube 92 and an electrical grid 93. The transparent box 91 forms a compartment 911. The ultraviolet light tube 92 is arranged in the compartment 911. The electrical grid 93 is mounted on the bottom of the compartment 911. The electrical grid 93 includes a plurality of openings 931 where the external air is able to flow into the compartment 911 of the transparent box 91 therethrough.

When the bug zapper 9 is in use, the ultraviolet light tube 92 is turned on first. Since the mosquitoes are attracted by light (especially with the ultraviolet light having a wavelength of 360 nm to 400 nm), the radiated ultraviolet light of the light tube 92 is able to attract the mosquitoes. As a result, the mosquitoes will approach the transparent box 91 and fly into the compartment 911 via the openings 931. The mosquitoes will be killed by the electrical shock when contacting the electrical grid 93. As a result, the mosquito-borne diseases can be stopped from spreading. Such a bug zapper is shown in FIG. 2 of Taiwan Patent No. M337975.

In the above structure, the ultraviolet light tube 92 is arranged in the compartment 911. In this regard, when the ultraviolet light tube 92 is on, the ultraviolet light will emit outwards via the transparent box 91. Although the ultraviolet light can attract mosquitoes, the ultraviolet light is too dazzling. Furthermore, it may be harmful to health when eyes are frequently exposed to the ultraviolet light. Although the amount of the ultraviolet light that emits outwardly of the transparent box 91 can be reduced by lowering the degree of transparency of the transparent box 91 in order to reduce the hazardous effect to the eyes, the desired mosquito attracting efficiency cannot be maintained if the ultraviolet light is not strong enough.

In light of this, it is necessary to provide a bug zapper which overcomes the problem of the conventional bug zapper 9 where a high mosquito attracting efficiency cannot be provided without producing a harmful effect to the health.

SUMMARY OF THE INVENTION

It is therefore the objective of this invention to provide a bug zapper which improves the efficiency in attracting the mosquitoes by reflecting the light, thus lowering the light intensity to an acceptable range.

In an embodiment of the invention, a bug zapper including a body, a fan and a light source is disclosed. The body has a compartment, an opening, a channel arranged between the compartment and the opening, and a coupling portion arranged between the compartment and the channel. The channel is formed by an enclosed reflection wall and gradually expands from the coupling portion towards the opening. The fan is coupled with the coupling portion. The light source is mounted on a location of the body adjacent to the fan and irradiates light in the channel.

In a form shown, the enclosed reflection wall includes an upper wall, a lower wall and two lateral walls. The body further includes an extension portion coupled with the lower wall and extending towards the opening.

In the form shown, the extension portion includes a drain hole.

In the form shown, a photocatalyst layer is arranged on one of the upper wall, the lower wall and the two lateral walls.

In the form shown, the photocatalyst layer has a rough surface.

In the form shown, the bug zapper further includes an electrical grid coupled with the body and arranged between the fan and the compartment.

In the form shown, the bug zapper further includes a solar panel coupled with the body, as well as an electricity box storing the electricity generated by the solar panel and electrically coupled with the fan and the light source.

In the form shown, the solar panel is pivotably coupled with the body.

In the form shown, the body further includes a mesh coupled with the opening.

In the form shown, the light source is arranged in a path surrounding the fan.

In the form shown, the light source is in a form of a light-emitting diode irradiating ultraviolet light.

In the form shown, the light source is in a form of a light bar having a plurality of chip sets. Each of the plurality of chip sets includes a plurality of chips and is spaced from an adjacent one of the plurality of chip sets by a distance.

In the bug zapper of the embodiment of the invention, the fan and the light source are coupled with the body. Thus, the fan will operate to draw the approaching mosquitoes into the compartment, causing the death of the mosquitoes that are trapped in the compartment. Since the light source is arranged in the compartment and the light of the light source can be emitted outwards only from the opening, the intensity of the light that is received by the eyes will be significantly reduced. Advantageously, the efficiency in attracting the mosquitoes is outstanding and the negative effect to the human is reduced.

Since the bug zapper of the embodiment of the invention includes the extension portion, the time that the light travels in the body will be effectively prolonged. As a result, the mosquitoes will have a greater tendency in staying in the channel of the bug zapper while more mosquitoes are guided into the channel. Thus, the bug zapper is able to have a higher efficiency in collecting the mosquitoes.

Since the bug zapper of the embodiment of the invention includes the photocatalyst layer, the organic pollutant around the photocatalyst layer may be decomposed by the irradiated light of the light source, leading to the generation of the carbon dioxide and water. The generated carbon dioxide and water can simulate the substance generated during the human breathing. As such, the efficiency in attracting the mosquitoes is enhanced, and the air is purified.

Since the bug zapper of the embodiment of the invention includes the solar panel that generates electricity for use of the fan and the light source, the bug zapper is able to operate in an environment with an unstable supply of the mains electricity. Thus, the use of the bug zapper is less limited to the environment.

In the bug zapper of the embodiment of the invention, since the fan and the electrical grid may be mounted to the coupling portion in positions distant to the channel, the noises generated from the electric shock of the mosquitoes as well as from the operation of the fan can be lowered, providing a low noise function of the bug zapper.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
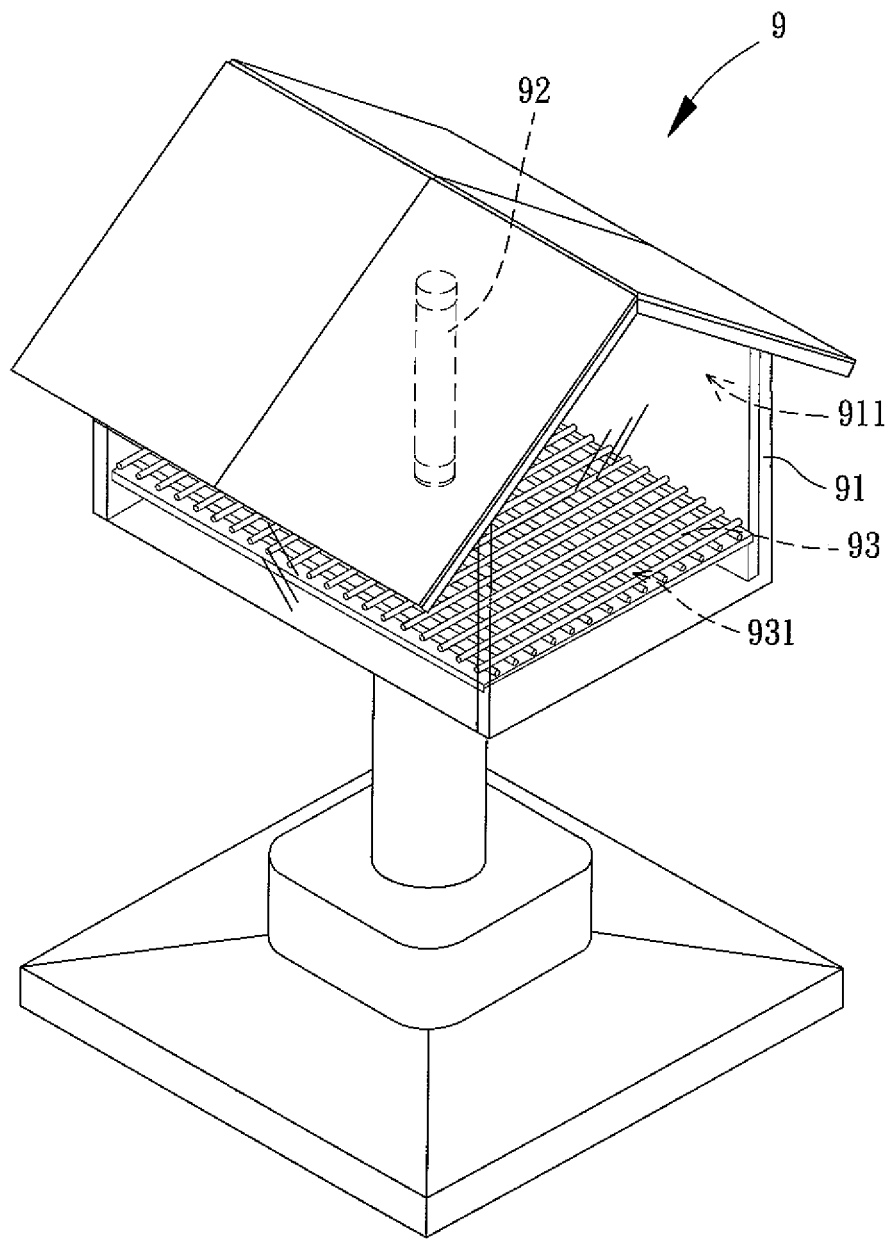
FIG. 1 is a perspective view of a conventional bug zapper.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
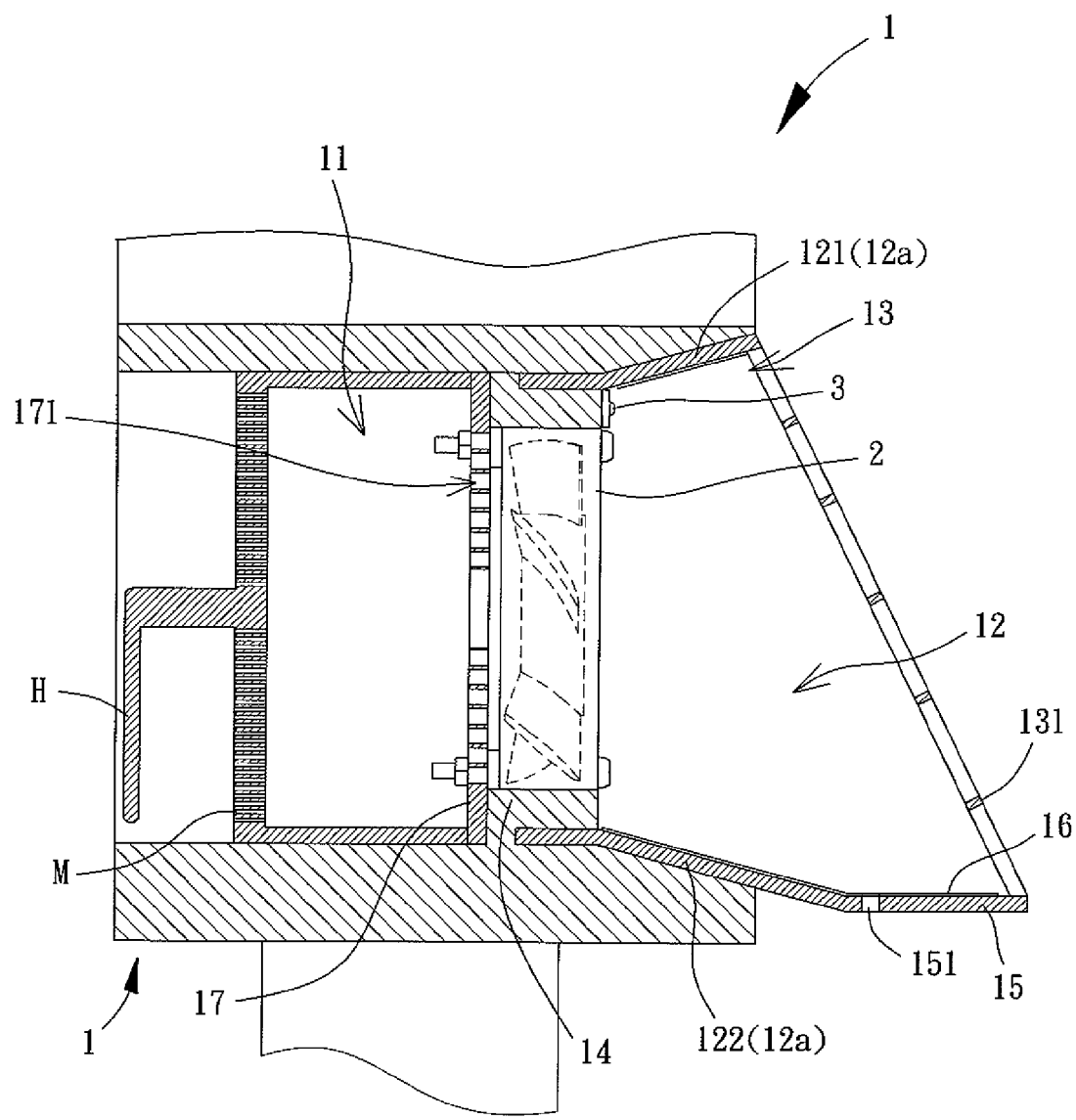
FIG. 2 is a cross sectional view of a bug zapper according to an embodiment of the invention.

FIG. 2 is a cross sectional view of a bug zapper according to an embodiment of the invention. The bug zapper includes a body 1, a fan 2 and a light source 3. The fan 2 and the light source 3 are arranged in the body 1. The light source 3 is adjacent to the fan 2. In the embodiment of the invention, the mosquitoes are guided into the body 1 as attracted by the light source 3 and sucked by the fan 2. As such, the mosquitoes are trapped in the body 1.

Specifically, the body 1 includes a compartment 11, a channel 12 and an opening 13. The channel 12 is located between the compartment 11 and the opening 13. The external air is able to flow into the channel 12 via the opening 13. A mesh 131 is preferably coupled with a periphery of the opening 13. The mesh 131 is used to obstruct larger insects from entering the channel 12. The body 1 further includes a coupling portion 14 located between the compartment 11 and the channel 12. The channel 12 communicates the compartment 11 with the opening 13. The channel 12 gradually increases towards the opening 13. More specifically, the part of the channel 12 adjacent to the coupling portion 14 has a smaller cross section, and the part of the channel 12 adjacent to the opening 13 has a larger cross section, thus rendering the channel 12 in a gradually expanding manner.

The channel 12 is formed by an enclosed reflection wall 12a. The reflection wall 12a includes an upper wall 121, a lower wall 122 and two lateral walls 123 (please refer to FIG. 3). The body 1 preferably further includes an extension portion 15 coupled with the lower wall 122. The extension portion 15 starts from inside the channel 12 and extends towards the opening 13. As such, a larger area may be provided for reflecting the light of the light source 3, thereby prolonging the time the light travels in the compartment 11. Another advantage is that the light can be reflected upwards such that the bug zapper can be arranged in a lower place where the opening 13 is not straight on the line of sight of the user. Moreover, the extension portion 15 further includes a drain hole 151 that prevents water, which flows into the channel 12 during a raining day, from accumulating in the channel 12. Thus, breeding of the mosquitoes in the channel 12 can be prevented. Furthermore, the inner surface of the reflection wall 12a is preferably made of a material with a high reflection coefficient such as a mirror, an alloy or a metal. As such, the light emitted by the light source 3 can be constantly reflected in the channel 12 to maintain the light intensity of the channel 12.

The body 1 preferably further includes a photocatalyst layer 16, which may be arranged on at least one of the upper wall 121, the lower wall 122 and the two lateral walls 123. The photocatalyst layer 16 preferably has a rough surface in order to increase the scattering of light in the channel 12. If the body 1 is not provided with any photocatalyst layer 16, the upper wall 121, the lower wall 122 and the two lateral walls 123 may also be in an uneven form to increase the scattering of light in the channel 12. The body 1 may further include an electrical grid 17 arranged between the coupling portion 14 and the compartment 11. The electrical grid 17 includes a plurality of openings 171 to allow passage of the mosquitoes.

Figure 3:
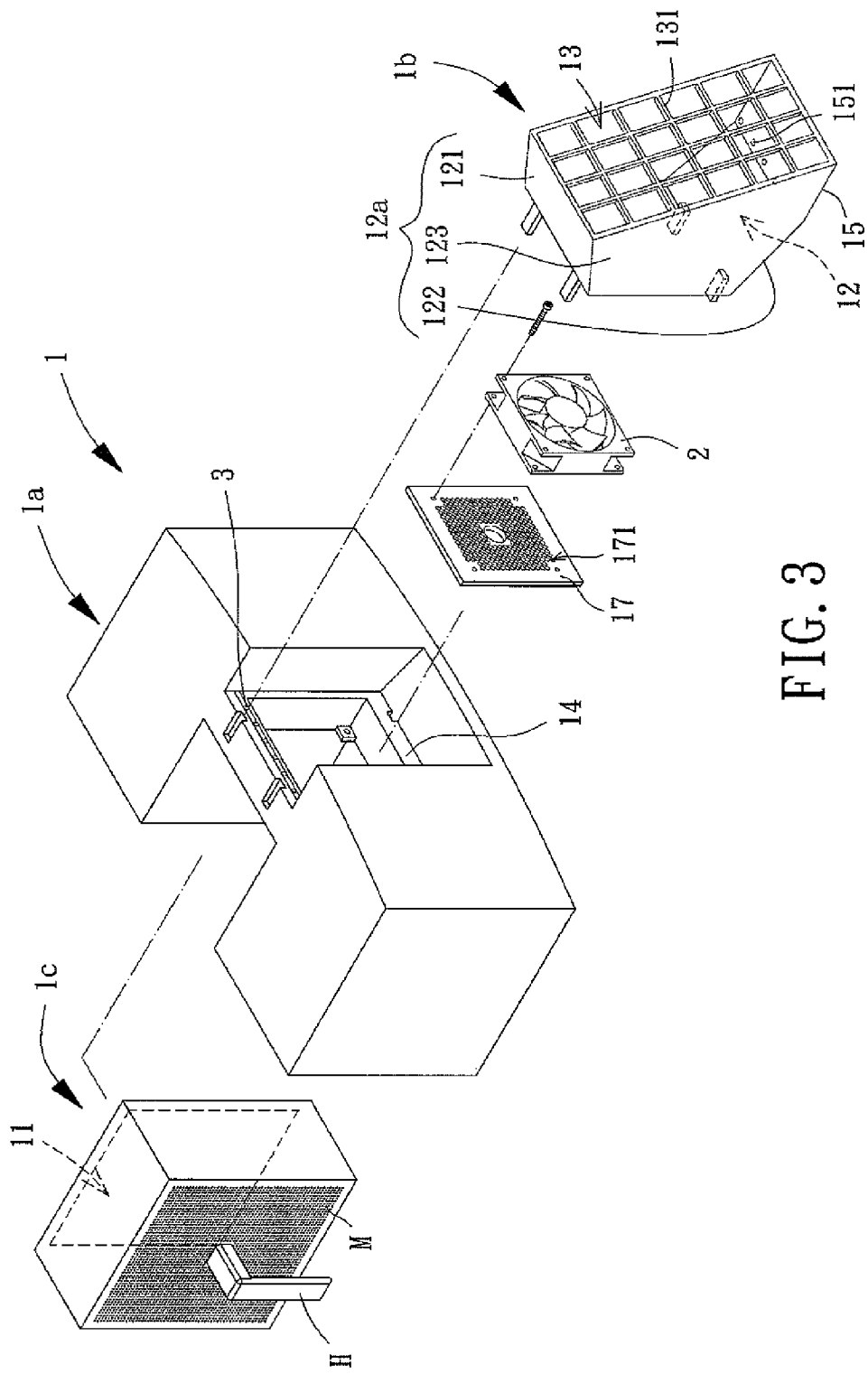
FIG. 3 is an exploded view of the bug zapper of the embodiment of the invention.

Referring to FIG. 3, the body 1 includes a main part 1a, a holder 1b and a mosquito box 1c. One face of the mosquito box 1c is provided with a mesh having a plurality of openings "M" along with a handle "H." Each of the plurality of openings "M" has a size smaller than a general mosquito so that the mosquito will not be ableto exit the mosquito box 1c via the plurality of openings "M." The holder 1b and the mosquito box 1c are coupled with two sides of the main part 1a. The coupling portion 14 is arranged on the main part 1a. The main part 1a and the holder 1b are coupled with each other to form the channel 12, and the mosquito box 1c and the main part 1a are coupled with each other to form the compartment 11. However, the structure of the body 1 is not limited to what is shown in the embodiment.

The fan 2 is mounted to the coupling portion 14. When the external air is guided into the channel 12, the air in the channel 12 is quickly guided into the compartment 11 by the fan 2. Therefore, when the fan 2 rotates, the mosquitoes that fly into the channel 12 will be guided into the compartment 11 under the flow of air. In the embodiment, the fan 2 is coupled with the electrical grid 17. In this regard, the electrical grid 17 is fixed to the coupling portion 14 in order for the fan 2 to be mounted on the coupling portion 14.

Figure 4:
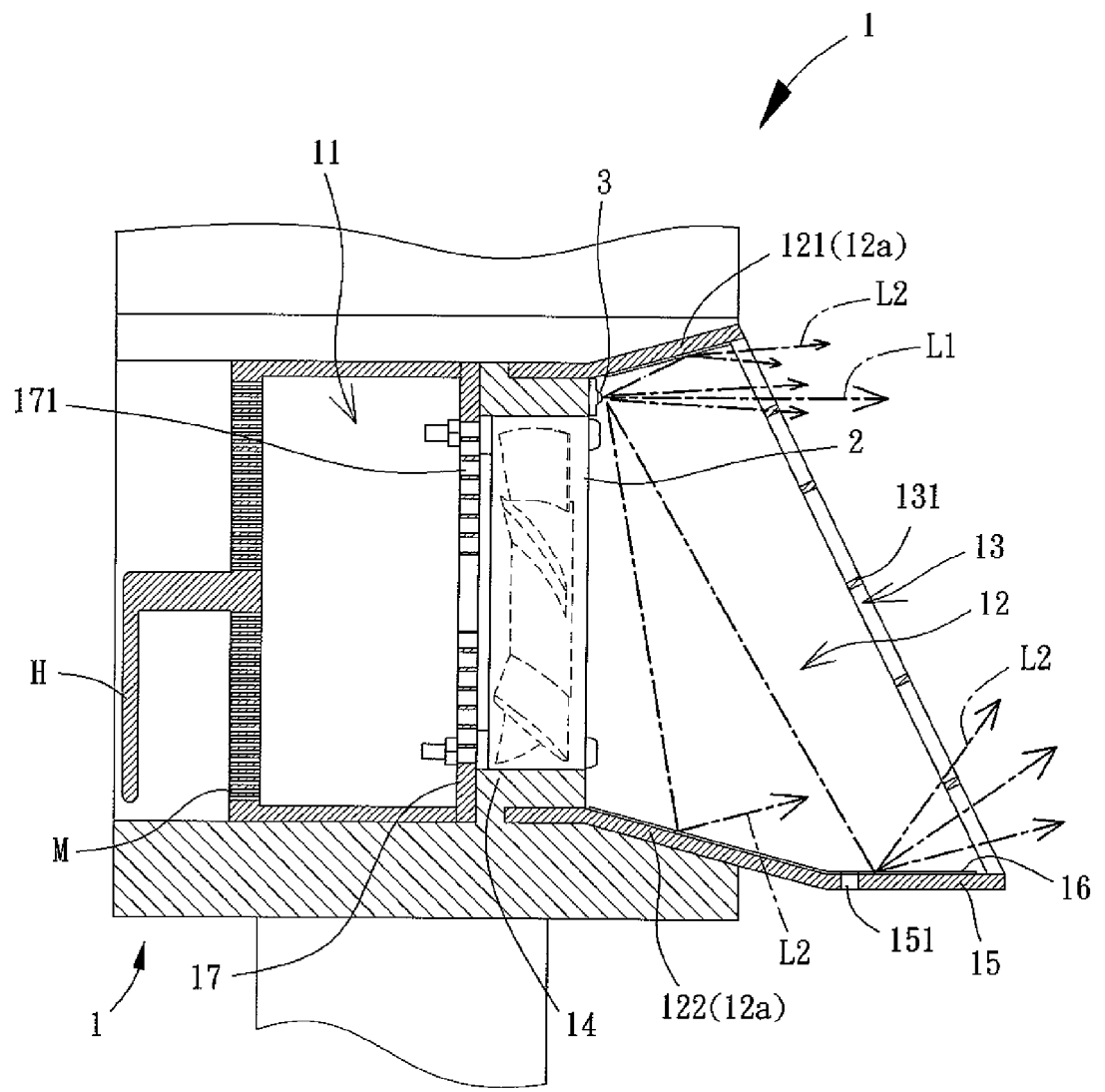
FIG. 4 is the cross sectional view of the bug zapper of the embodiment of the disclosure showing the light radiation.
Figure 5:
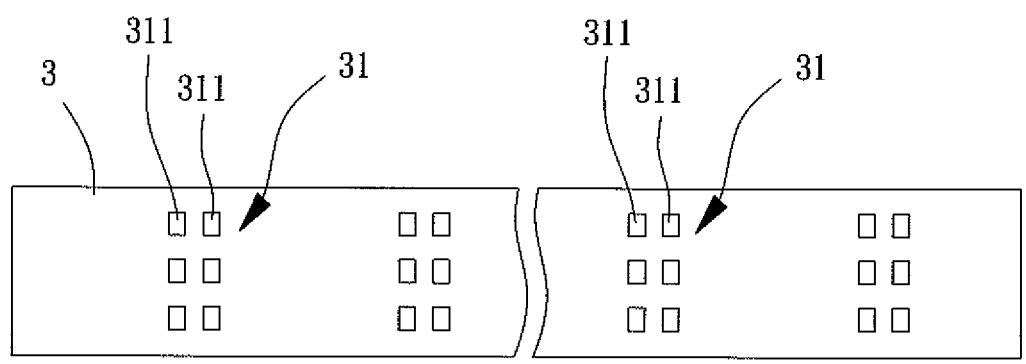
FIG. 5 is a top view of a light source of the bug zapper of the embodiment of the invention.

Referring to FIGS. 3 and 4, the light source 3 is coupled with the coupling portion 14 of the body 1 such that the light source 3 is adjacent to the fan 2. Preferably, the light source 3 is arranged in a path surrounding the fan 2 to provide an omnidirectional and enhanced illuminating effect of the channel 12. Thus, the mosquitoes will be attracted more efficiently under the enhanced light intensity. The light source 3 irradiates first light L1 with relatively smaller angles, as well as light L2 with relatively larger angles. The light source 3 is preferably a light-emitting diode (LED) in order to precisely control the radiation angle of the light source 3. In addition, the light source 3 preferably irradiates the ultraviolet light in order to efficiently guide the mosquitoes into the channel 12. Referring to FIG. 5, the light source 3 in the embodiment is in the form of a light bar having a plurality of chip sets 31. Each chip set 31 is spaced from another adjacent one by a distance. Each chip set 31 includes a. plurality of chips 311. In this arrangement, each chip set 31 is able to increase the light intensity on a respective area of the channel 12. As a result, the mosquitoes will be attracted by the light and approach the fan 2.

Figure 6:
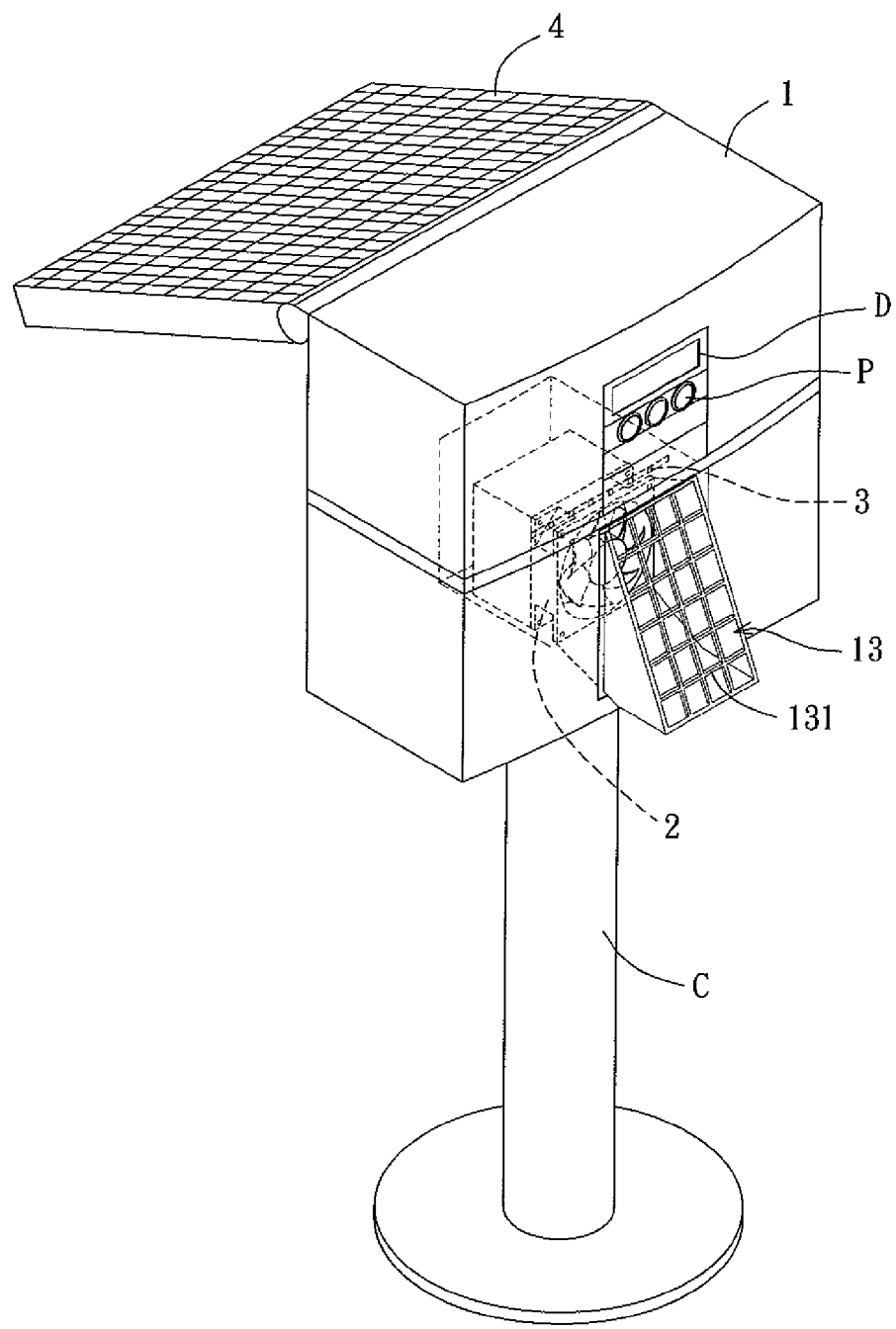
FIG. 6 is a perspective view of the bug zapper of the embodiment of the invention.
Figure 7:
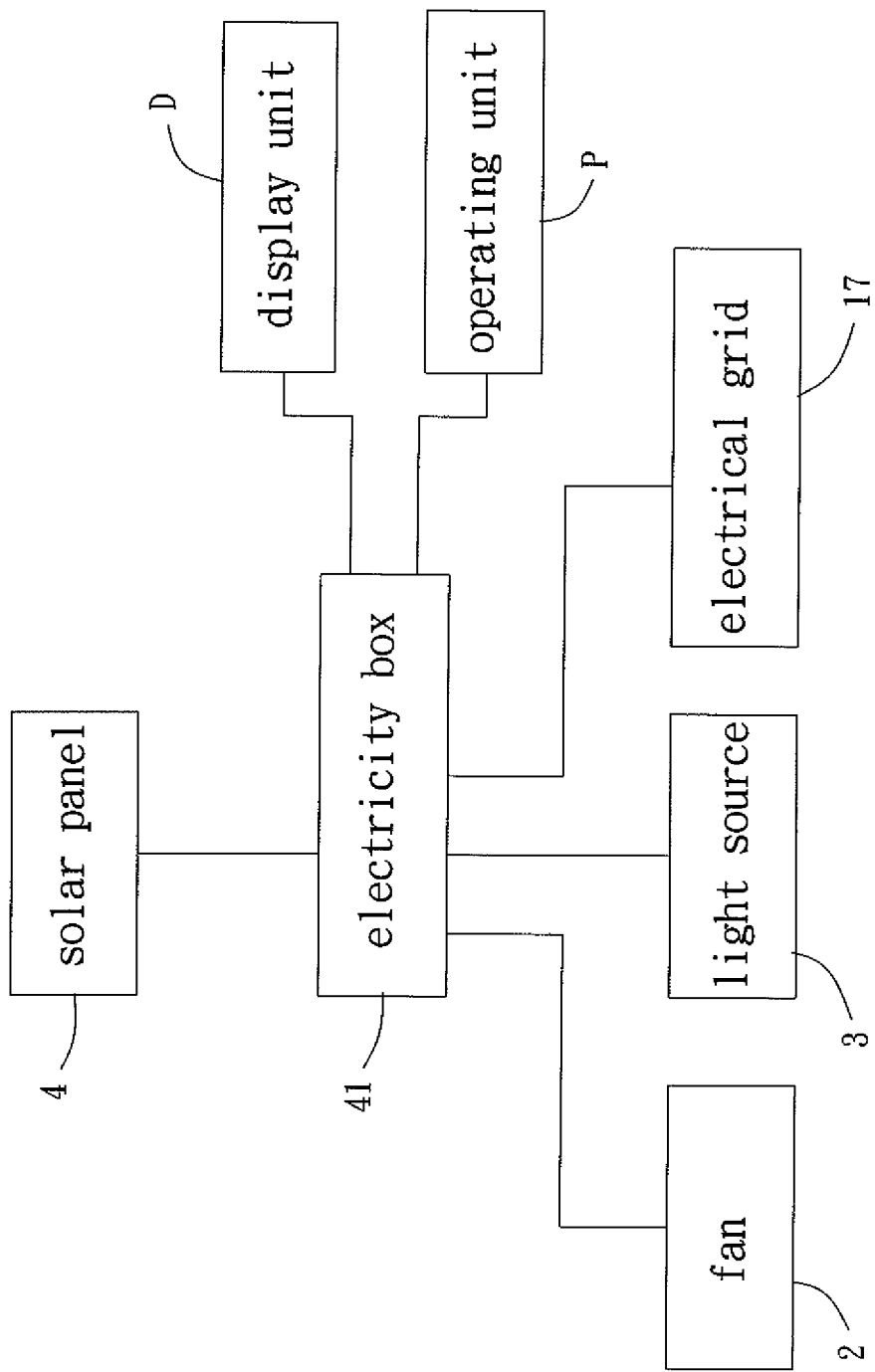
FIG. 7 is a block diagram of the bug zapper of the embodiment of the invention.

Referring to FIGS. 6 and 7, the bug zapper of the embodiment of the invention may further include a solar panel 4 and an electricity box 41. The solar panel 4 generates electricity based on the sunlight, and the generated electricity is stored in the electricity box 41. The solar panel 4 is pivotable coupled with the body 1. The angle of the solar panel 4 can be adjusted to follow the orbit of the sun, to increase the efficiency in collecting the solar energy. In the embodiment, the solar panel 4 is coupled with the main part 1a of the body 1, and the electricity box 41 is electrically connected to the fan 2, the light source 3 and the electrical grid 17. As such, the electricity generated from the solar power may be supplied to the fan 2, the light source 3 and the electrical grid 17. The bug zapper may also be connected to the mains supply so that the operation of the bug zapper can be maintained when the solar panel 4 does not collect sufficient solar energy. The body 1 may further include a display unit "D" and an operating unit "P." The display unit "D" and the operating unit "P" are coupled with the electricity box 41. Through the display unit "D" indicating the amount of the remaining electricity of the electricity box 41, the operating unit "P" may be operated to switch between the mains supply and the electricity box 41, as shown in FIG. 5.

Please refer back to FIG. 4, after the fan 2 and the light source 3 are turned on, the first light L1 will emit outwardly from the opening 13. Based on this, the mosquitoes will fly into the channel 12 as attracted by the first light L1. In this regard, since the second light L2 have relatively larger angles, the second light L2 will emit onto the enclosed reflection wall 12a. As a result, the second light L2 will be reflected by the enclosed reflection wall 12a, making the channel 12 full of a wide area of soft reflective light. Therefore, the mosquitoes are guided into the channel 12 as attracted by the first light L1. Then, the mosquitoes tend to stay in the channel 12 as attracted by the second light L2 and fly along a path as guided by the increasing light intensity. As a result, the mosquitoes will fly deep into the channel 12 and gradually approach the light source 3. When the mosquitoes are close enough to the light source 3, the mosquitoes will be sucked into the fan 2 by the flow of air. The mosquitoes are then blown into the compartment 11 and will not be able to escape from the compartment 11 as obstructed by the walls of the mosquito box 1c as well as the intensive flow of air. Finally, the mosquitoes will die from the drying of air. Alternatively, when the bug zapper of the embodiment of the invention includes the electrical grid 17, the sucked mosquitoes as blown by the air will touch the electrical grid 17. As such, the mosquitoes will die from electric shock, thus improving the efficiency in killing the mosquitoes. The air that is drawn from the channel 12 into the compartment 11 can be discharged via the plurality of openings "M" of the mosquito box 1c.

Referring to FIG. 6 again, when in the use, the body 1 is spaced from the ground via a post "C." In this regard, the body 1 is spaced from the ground by at least 50 centimeters in order to meet the height of the flying mosquitoes. Thus, it would be easier for the mosquitoes to fly into the channel 12 via the opening 13. Since the bugger zapper of the embodiment of the invention includes the photocatalyst layer 16, when the light source 3 is on, the pollutants in the air around the photocatalyst layer 16 will react with the photocatalyst and turn into water and carbon dioxide. The product of the reaction can simulate the substance generated during human breathing, thus enhancing the attraction to the mosquitoes. In the same time, the pollutant in the photocatalyst layer 16 is decomposed, and the air is purified. On the other hand, since the heat is generated during the operations of the fan 2 and the light source 3, the temperature of the ambient air will increase. The generated heat can simulate the temperature of the human body, thus enhancing the efficiency in attracting the mosquitoes.

In conclusion, in the bug zapper of the embodiment of the invention, the fan 2 and the light source 3 are coupled with the body 1, and the body 1 includes the channel 12 that gradually increases from the fan 2 towards the opening 13. Based on this, the light source 3 is placed in a location adjacent to the fan 2. The light source 3 irradiates the first light L1 that guide the mosquitoes into the channel 12, as well as the second light L2 that are reflected by the enclosed reflection wall 12a to maintain the luminous effect of the channel 12. As such, the mosquitoes will fly deep into the channel 12 as attracted by the light and fly towards the chip set 31 with the largest light intensity. At the same time, the approaching mosquitoes will be sucked into the compartment 11 by the fan 2 and will be trapped in the compartment 11, causing the death of the mosquitoes. Since the light source 3 is arranged in the compartment 11 where the light of the light source 3 is emitted outwards only from the opening 13, the intensity of the light that is received by the eyes will be significantly reduced. Advantageously, the efficiency in attracting the mosquitoes is outstanding while the negative effect to the human is reduced.

Based on the above, since the body 1 is provided with the extension portion 15, the time that the light travels in the body 1 will be effectively prolonged. Furthermore, the light is reflected outwards in an upward direction. Therefore, the mosquitoes will have a greater tendency in staying in the channel 12 while more mosquitoes are guided into the channel 12. Thus, the bug zapper will have a greater efficiency in attracting the mosquitoes.

In addition, since the reflection wall 12a is provided with the photocatalyst layer 16, the organic pollutants around the photocatalyst layer 16 may be decomposed by the irradiated light of the light source 3. The generated carbon dioxide and water can simulate the substance generated during human breathing. As such, the efficiency in attracting the mosquitoes is enhanced, and the air is purified.

Furthermore, since the solar panel 4 converts the solar energy into electricity for use of the fan 2 and the light source 3, the bug zapper may operate in an environment with an unstable supply of the mains electricity. Thus, the use of the bug zapper is not limited to the environment, and the utility is improved.

Moreover, the luminous effect of the channel 12 is maintained by reflecting the light of the light source 3. As such, the fan 2 and the electrical grid 17 may be mounted to the coupling portion 14 deep inside the channel 12. In this regard, the noises generated from the electric shock of the mosquitoes as well as from the operation of the fan 2 can be lowered, providing a low noise function of the bug zapper.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A bug zapper comprising:
a body including a main part, a holder, and a mosquito box, wherein the main part includes a front surface and a rear surface spaced from the front surface in a longitudinal direction, wherein the main part further includes a top surface extending between the front surface and the rear surface, wherein the main part further includes a front groove extending from the front surface toward but spaced from the rear surface and having an end wall extending perpendicularly to the longitudinal direction, wherein the front groove extends to the top surface in a vertical direction perpendicular to the longitudinal direction and has an open top end, wherein the holder is removably mounted in the front groove of the main part and includes an enclosed reflection wall, wherein the main part further includes a rear groove extending from the rear surface toward but spaced from the front surface and having an end wall extending perpendicularly to the longitudinal direction, wherein the end wall of the front groove is spaced from the rear groove in the longitudinal direction, wherein the rear groove extends to the top surface in the vertical direction and has an open top end, wherein a coupling portion is formed between the end wall of the front groove and the end wall of the rear groove, wherein an intermediate groove extends through the coupling portion from the end wall of the front groove through the end wall of the rear groove, leaving a bridge between the open top ends of the front groove and the rear groove, wherein the mosquito box is removably mounted in the rear groove, with the mosquito box having a compartment aligned with the intermediate groove, wherein the holder includes an opening and a channel aligned with the intermediate groove and arranged between the compartment and the opening, wherein the coupling portion is arranged between the compartment and the channel, and wherein the channel is formed by the enclosed reflection wall and has gradually increasing heights in the vertical direction from the coupling portion towards the opening;
a fan coupled with the coupling portion and received in the intermediate groove; and
a light source mounted on a location of the body adjacent to the fan, wherein the light source irradiates light in the channel.

2. The bug zapper as claimed in claim 1, wherein the enclosed reflection wall comprises an upper wall, a lower wall and two lateral walls extending between the upper wall and the lower wall, wherein the upper wall and the lower wall extend forward away from each other, wherein the holder further comprises an extension portion extending forward from a front end of the lower wall, wherein the opening is defined between a front end of the upper wall and the front end of the lower wall, and wherein the front end of the upper wall is located between the front end of the lower wall and a rear end of the lower wall in the longitudinal direction.

3. The bug zapper as claimed in claim 2, wherein the extension portion comprises a drain hole.

4. The bug zapper as claimed in claim 2, further comprising a photocatalyst layer arranged on one of the upper wall, the lower wall and the two lateral walls.

5. The bug zapper as claimed in claim 4, wherein the photocatalyst layer has a rough surface.

6. The bug zapper as claimed in claim 1, further comprising an electrical grid mounted in the rear groove, coupled with the coupling portion of the body and arranged between the fan and the compartment, wherein the mosquito box further includes a handle attached to a rear side thereof, and wherein the mosquito box including the handle is completely received in the rear groove.

7. The bug zapper as claimed in claim 2, further comprising an electrical grid mounted in the rear groove, coupled with the body and sandwiched between the fan and the mosquito box, wherein the mosquito box further includes a handle attached to a rear side thereof, and wherein the mosquito box including the handle is completely received in the rear groove.

8. The bug zapper as claimed in claim 1, further comprising a solar panel and an electricity box, wherein the body further includes an upper part mounted on the top surface of the main part and having a side, wherein the solar panel is directly and pivotably coupled with the side of the upper part of the body, with the electricity box storing the electricity generated by the solar panel and electrically coupled with the fan and the light source.

9. The bug zapper as claimed in claim 2, further comprising a solar panel and an electricity box, wherein the body further includes an tipper part mounted on the top surface of the main part and having a side, wherein the solar panel is directly and pivotably coupled with the side of the upper part of the body, with the electricity box storing the electricity generated by the solar panel and electrically coupled with the fan and the light source.

10. The bug zapper as claimed in claim 1, wherein the holder of the body further comprises a mesh coupled with the opening.

11. The bug zapper as claimed in claim 2, wherein the holder of the body further comprises a mesh coupled with the opening.

12. The bug zapper as claimed in claim 1, wherein the light source is arranged in a path surrounding the fan.

13. The bug zapper as claimed in claim 2, wherein the light source is arranged in a path surrounding the fan.

14. The bug zapper as claimed in claim 1, wherein the light source is in a form of a light-emitting diode irradiating ultraviolet light.

15. The bug zapper as claimed in claim 2, wherein the light source is in a form of a light-emitting diode irradiating ultraviolet light.

16. The bug zapper as claimed in claim 14, wherein the light source is in a form of a light bar having a plurality of chip sets, and wherein each of the plurality of chip sets comprises a plurality of chips and is spaced from an adjacent one of the plurality of chip sets by a distance.

17. The bug zapper as claimed in claim 15, wherein the light source is in a form of a light bar having a plurality of chip sets, and wherein each of the plurality of chip sets comprises a plurality of chips and is spaced from an adjacent one of the plurality of chip sets by a distance.

18. The bug zapper as claimed in claim 1, wherein the bridge includes at least one upper coupling groove in the top surface of the main part, wherein the end wall of the front groove includes at least one lower coupling groove, wherein the holder includes a rear side having at least one upper leg and at least one lower leg, wherein the at least one upper leg is removably mounted in the at least one upper coupling groove, and wherein the at least one lower leg is removably mounted in the at least one lower coupling groove.

\* \* \* \* \*